(12) United States Patent
Powell

(10) Patent No.: US 6,390,138 B2
(45) Date of Patent: May 21, 2002

(54) LOW RESTRICTION HOSE AND SEAL ASSEMBLY

(75) Inventor: Jeff Powell, Windsor (CA)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/788,826

(22) Filed: Feb. 20, 2001

Related U.S. Application Data

(60) Provisional application No. 60/187,731, filed on Mar. 8, 2000.

(51) Int. Cl.$^7$ ................................................. F16L 27/11
(52) U.S. Cl. ..................... 138/114; 138/120; 285/226; 285/299; 285/145.5
(58) Field of Search ................................. 138/120, 114, 138/118, 110; 285/226, 299, 145.5, 227

(56) References Cited

U.S. PATENT DOCUMENTS

| | | | |
|---|---|---|---|
| 3,369,829 A | * | 2/1968 | Hopkins ................. 285/226 X |
| 3,388,931 A | | 6/1968 | Johnson et al. ............. 285/159 |
| 4,283,078 A | | 8/1981 | Ross et al. |
| 4,350,372 A | | 9/1982 | Logsdon |
| 5,083,817 A | * | 1/1992 | Holzhausen et al. .... 285/226 X |
| 5,370,427 A | | 12/1994 | Hoelle et al. |
| 5,480,194 A | * | 1/1996 | Mantoan et al. ........ 285/226 X |
| 5,542,715 A | * | 8/1996 | Mantoan et al. ............. 285/226 |
| 5,662,974 A | | 9/1997 | Andrenacci et al. ....... 428/36.9 |
| 5,689,954 A | | 11/1997 | Blocker et al. .......... 138/155 X |
| 5,784,881 A | * | 7/1998 | Otsuka et al. ........... 285/226 X |
| 5,786,053 A | | 7/1998 | Andrenacci et al. ....... 428/36.9 |
| 5,971,035 A | | 10/1999 | Griffioen ..................... 138/155 |
| 6,109,661 A | * | 8/2000 | Cwik et al. ............. 285/299 X |
| 6,216,745 B1 | * | 4/2001 | Augustynowicz et al. .. 138/114 X |

FOREIGN PATENT DOCUMENTS

| | | |
|---|---|---|
| EP | 0 807 749 A2 | 11/1997 |
| FR | 2 745 926 | 9/1997 |
| FR | 2 755 493 | 5/1998 |

OTHER PUBLICATIONS

European Search Report dated Jun. 12, 2001.

* cited by examiner

Primary Examiner—Patrick Brinson

(57) ABSTRACT

A polymeric hose assembly including a male hose inserted within a female hose connects an air cleaner to an internal combustion engine. An elastomeric seal including a plurality of bellows is bonded around the circumference of the exterior surfaces of the female hose and the male hose at bonding points. The plurality of bellows expand to allow for the expansion of the hose assembly to accommodate for engine movement and vibrations.

8 Claims, 1 Drawing Sheet

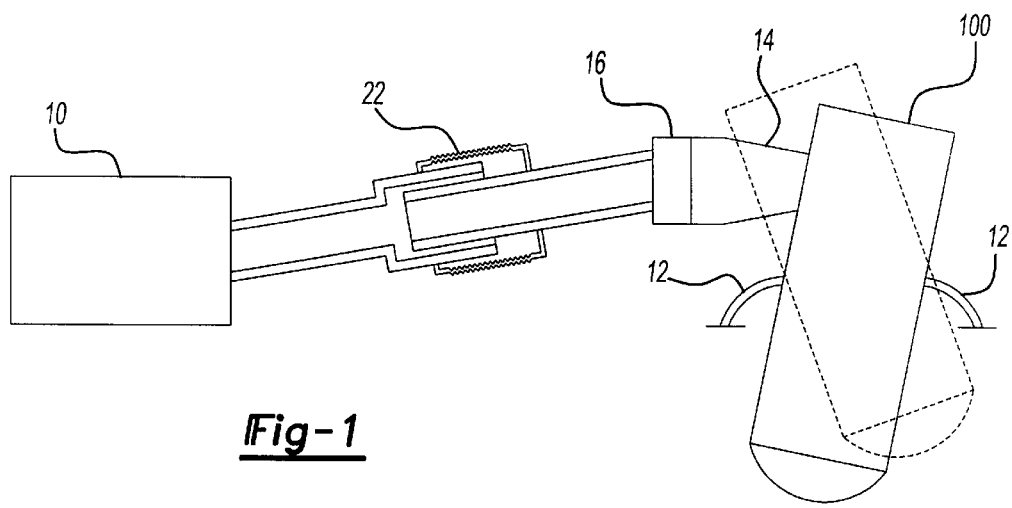
_Fig-1_
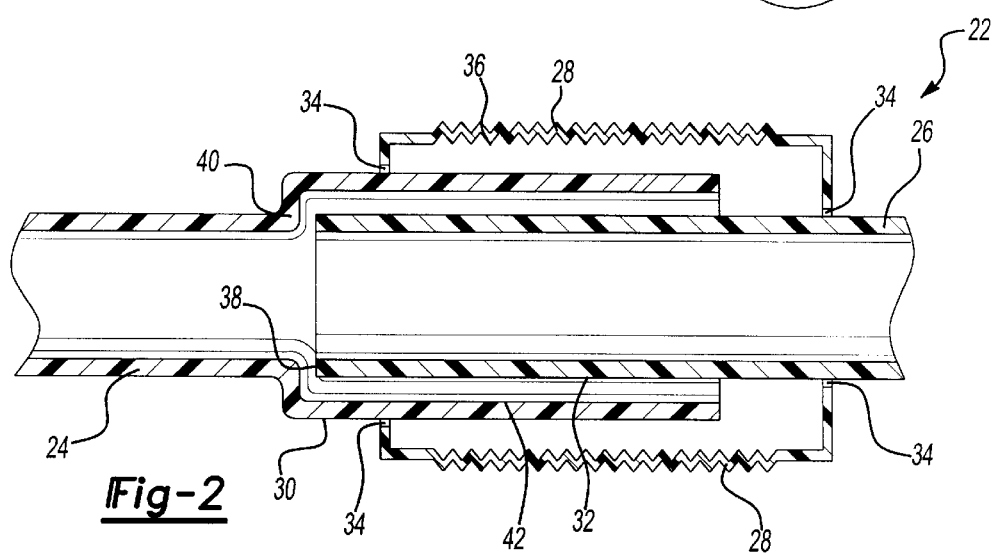
_Fig-2_
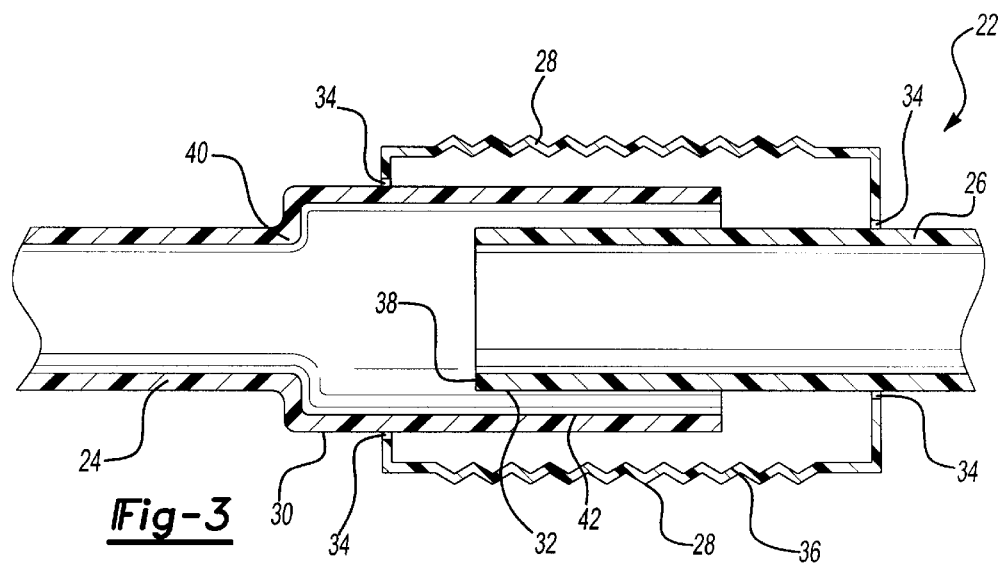
_Fig-3_

LOW RESTRICTION HOSE AND SEAL ASSEMBLY

This application claims priority from provisional application serial No. 60/187,731 filed Mar. 8, 2000.

BACKGROUND OF THE INVENTION

The present invention relates generally to a low restriction hose and seal assembly which allows for changes in duct length of a hose connecting an air cleaner to an engine.

An air cleaner brings air into an internal combustion engine at the required temperature and velocity. A hose is commonly employed to connect the air cleaner to the engine. During operation, the engine may move up to one inch due to vibrations. The hose commonly includes a plurality of bellows which accommodate the movement of the engine. If the engine moves during operation, the bellows on the hose contract and expand, allowing for expansion of the hose and accommodating for engine movement.

There are several drawbacks to utilizing a hose which includes a plurality of bellows. For one, the manufacturing of a hose with bellows is expensive. Additionally, the bellows restrict air flow through the hose.

Hence, there is a need in the art for a low restriction hose and seal assembly which allows for changes in duct length of a hose connecting an air cleaner to an engine.

SUMMARY OF THE INVENTION

The present invention relates generally to a low restriction hose and seal assembly which allows for changes in duct length of a hose connecting an air cleaner to an engine.

A hose assembly connects an air cleaner to an internal combustion engine. A male hose inserted within a female hose is slidably connected by an elastomeric seal with a plurality of bellows. The elastomeric seal is bonded around the circumference of the exterior surfaces of the female hose and the exterior surface of the male hose at bonding points. In the preferred embodiment, the bellows are between 3 and 5 millimeters in height. In the preferred embodiment, the seal is bonded around the circumference of the exterior surfaces by welding or adhesive.

When the hose assembly is in the compressed state, the male hose is positioned within the female hose such that the internal end of the male hose substantially contacts a tapered end of the female hose. During engine operation, the movement of the engine and vibrations cause the female hose and the male hose to separate. As the external surface of the male hose substantially slides along the internal surface of the female hose, the bellows of the flexible elastomeric seal separate, allowing for the expansion of the seal. This allows for the expansion of the hose to accommodate for engine movement.

Accordingly, the present invention provides a low restriction hose and seal assembly which allows for changes in duct length of a hose connecting an air cleaner to an engine.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 1 illustrates an air intake and an engine.

FIG. 2 illustrates the low restriction hose and seal assembly of the present invention in the compressed state.

FIG. 3 illustrates the low restriction hose and seal assembly of the present invention in the extended state.

DETAILED DESCRIPTION OF THE PREFERRED EMBODIMENT

FIG. 1 illustrates an air cleaner 10 attached to an internal combustion engine 100 connected by a hose assembly 22. The hose assembly 22 is connected to a throttle body 16, which is secured to an intake manifold 14 that attaches to the engine 10. As the engine 100 operates, the engine will roll on mounts 12, requiring the hose assembly 22 to accommodate a change in hose length. During operation, the internal combustion engine 100 may move up to one inch or more due to vibrations and load. As the air cleaner 10 is connected to the engine, the hose assembly 22 must be able to accommodate for movement of the engine.

The polymeric hose assembly 22 as illustrated in FIGS. 2 and 3 includes a male hose 26 inserted within a female hose 24. The hoses 24, 26 are attached by a thin, flexible, elastomeric seal 28. The seal 28 is bonded around the circumference of the exterior surface 30 of the female hose 24 and around the circumference of the exterior surface 32 of the male hose 26 at bonding points 34. In the preferred embodiment, the seal 28 is bonded around the circumference of the exterior surfaces 30, 32 by appropriate plastic welding techniques.

The seal 28 includes a plurality of bellows 36. In the preferred embodiment, the bellows 36 are between 3 and 5 millimeters in height, but are not limited to this height. The bellows 36 are formed in the seal 28 substantially between the bonding points 34.

The hose assembly 22 in the compressed state is illustrated in FIG. 2. In the compressed stated, an internal end 38 of the male hose 26 substantially contacts a tapered end 40 of the female hose 24. The male hose 26 is positioned within the female hose 24 such that the external surface 32 of the male hose 26 substantially contacts the internal surface 42 of the female hose 24.

During engine operation, the movement of the engine causes the female hose 24 and the male hose 26 to separate, as illustrated in FIG. 3. As the external surface 32 of the male hose 26 substantially slides along the internal surface 42 of the female hose 24, the bellows 36 of the flexible elastomeric seal 28 separate, allowing for the expansion of the seal 28.

As the elastomeric seal 28 contains bellows 36 which allow for expansion of the seal 28, the female hose 24 and the male hose 26 of the hose 22 can slidingly separate to accommodate for engine movement.

The hose assembly 22 of the present invention can also be installed in an intake manifold 14 to act as the runners. By varying the runner length on an intake manifold 14, there are additional acoustic and flow tuning possibilities.

There are several advantages to utilizing a low restriction hose and seal assembly. For one, as flow through the hose assembly 22 does not contact the bellows 36, the flow through the hose assembly 22 is less restricted. Additionally, as the bellows 36 are formed in the seal 28 rather than in the hose assembly 22, the production of the hose assembly 22 is less expensive.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An air cleaner assembly comprising:
   an air cleaner component for delivering cleaned air to an engine component;
   a female tube;
   a male tube inserted within said female tube and with one of said male and female tube attached to said air cleaner component; and
   a seal including a plurality of bellows secured to said female tube and to said male tube to slidingly attach said tubes, said plurality of bellows allowing for sliding of said air cleaner assembly between a compressed state and an expanded state.

2. The air cleaner assembly as recited in claim 1 wherein said plurality of bellows expand when said air cleaner assembly slides from said compressed state to said expanded state.

3. The air cleaner assembly as recited in claim 1 wherein said plurality of bellows are between 3 and 5 millimeters deep.

4. The air cleaner assembly as recited in claim 1 wherein said seal is made of an elastomeric material.

5. The air cleaner assembly as recited in claim 1 wherein said seal is welded to an exterior surface of said female tube and to an exterior surface of said male tube.

6. The air cleaner assembly as recited in claim 5 wherein said seal is secured around a circumference of said exterior surface of said female tube and around a circumference of said exterior surface of said male tube.

7. The air cleaner assembly as recited in claim 1 wherein said female tube includes a tapered end and said male tube includes an insert end, said insert end substantially contacting said tapered end when said air cleaner assembly is in said compressed state.

8. An air cleaner assembly comprising:
   an air cleaner component for delivering cleaned air to an engine component;
   an engine component;
   a female tube;
   a male tube inserted within said female tube and with one of said male and female tube attached to said air cleaner component and the other of said male and female tube attached to said engine component; and
   a seal including a plurality of bellows secured to said female tube and to said male tube to slidingly attach said tubes, said plurality of bellows allowing for sliding of said air cleaner assembly between a compressed state and an expanded state.

* * * * *